United States Patent [19]

Iida

[11] Patent Number: 4,458,283
[45] Date of Patent: Jul. 3, 1984

[54] STATIC PROTECTIVE RELAY

[75] Inventor: Takashi Iida, Tokyo, Japan

[73] Assignee: Tokyo Shibaura Denki Kabushiki Kaisha, Kawasaki, Japan

[21] Appl. No.: 367,007

[22] Filed: Apr. 9, 1982

Related U.S. Application Data

[63] Continuation of Ser. No. 139,638, Apr. 14, 1980, abandoned.

[30] Foreign Application Priority Data

Apr. 18, 1979 [JP] Japan ................................. 54-46618

[51] Int. Cl.³ ............................................ H02H 3/253
[52] U.S. Cl. ......................................... 361/76; 361/93
[58] Field of Search ....................... 361/92, 96, 76, 77, 361/93

[56] References Cited

U.S. PATENT DOCUMENTS 3,225,256 12/1965 Carter et al. ....................... 361/76 X
3,431,467 3/1969 Calfee ..................................... 361/76
3,976,919 8/1976 Vandevier et al. ............... 361/76 X

OTHER PUBLICATIONS

Electronics, pp. 106-106, vol. 48, No. 18, Sep. 4, 1975, "Phase Sequence Detector Trips Circuit Breaker", Malarkey; 361/76.

Primary Examiner—Reinhard J. Eisenzopf
Attorney, Agent, or Firm—Oblon, Fisher, Spivak, McClelland & Maier

[57] ABSTRACT

A static protective relay at least includes a plurality of current transformers inserted in poly-phase AC power lines, a half-wave rectifying circuit for rectifying the output voltages from said current transformers, wave-shaping circuits for wave-shaping two of the pulsate output voltages from the half-wave rectifying circuit into rectangular wave output voltages, and a negative phase failure detecting circuit including a data flip-flop for detecting the level of the rectangular wave output to be phase-retarded at the instant of rising up of the rectangular wave output to be phase-advanced.

3 Claims, 10 Drawing Figures

STATIC PROTECTIVE RELAY

This is a continuation of application Ser. No. 139,638, filed Apr. 14, 1980, now abandoned.

BACKGROUND OF THE INVENTION

The present invention relates to a static protective relay for protecting poly-phase AC power lines.

Detrimental phenomena from which the poly-phase AC power lines are protected are, for example, phase sequence, negative phase failure, overload, and the like. An approach for protecting the poly-phase AC lines from such phenomena, which has been proposed, employs a plurality of monofunctional static relays of contact and contactless types by the number corresponding to that of the phenomena. Those static protective relays are not standardized. Therefore, the approach needs a complicated system design and thus a complicated construction of the system.

Some of the conventional protective relays employ protective function checking circuits provided for the protective functions in one-to-one correspondence. This type relay, however, encounters a difficulty in processing the signals derived from the function checking circuits. Furthermore, it is difficult to make particularly a negative phase sequence detecting circuit contained therein static or solid-state in the fabrication. In this respect, the conventional static protective relays are unsatisfactory in their maintenance and inspection.

SUMMARY OF THE INVENTION

Accordingly, an object of the invention is to provide a static protective relay which is compact in construction and inspection, and further may be standardized, and thus is easy and reliable in maintenance and inspection.

The above object of the invention may be realized by a static protective relay comprising converting means inserted in poly-phase AC power lines for producing voltages proportional to phase currents of the AC power lines half wave, rectifying means for rectifying voltages of at least neighboring two lines from said converting means, and negative phase sequence detecting means which memorize one of half-wave rectified voltages of said neighboring two lines at the instant that the other half-wave rectified voltage of said neighboring two lines transits from low to high.

Other objects and features of the invention will be apparent from the following description taken in connection with the accompanying drawings, in which:

DETAILED DESCRIPTION OF THE PREFERRED EMBODIMENT

Figure 1:
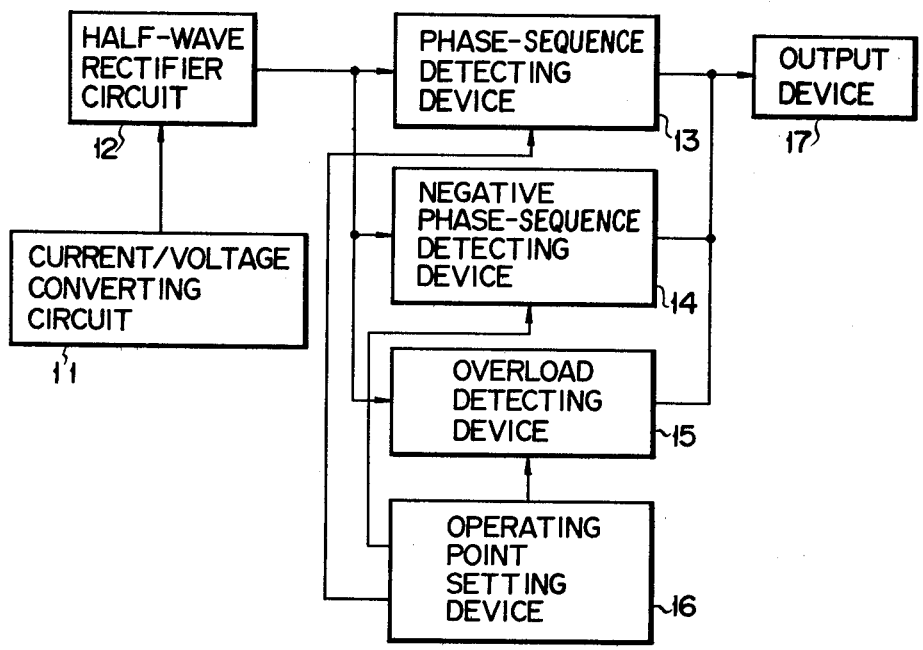
FIG. 1 is a scheme of an embodiment of a static protective relay according to the invention.

Referring now to FIG. 1, a current/voltage converting circuit 11 is coupled with poly-phase AC lines to be protected. The AC power lines are, for example, three-phase power lines and the converting circuit 11 is used for producing voltages proportional to each phase current. The output voltages from the converting circuit 11 are applied to a half-wave rectifying circuit 12 where they are rectified, and the pulsate output voltages rectified are applied to detecting devices, for example, a phase-failure detecting device 13, a negative phase-sequence detecting device 14, and an overload detecting device 15. An operating point setting device 16 is provided for setting operating points of the respective detecting element devices 13, 14 and 15.

When any one of those detecting devices 13 to 15 detects a corresponding failure on the AC power lines, it produces an output signal which in turn is applied to an output device 17 thereby to obtain a given trip output signal.

Figure 2:
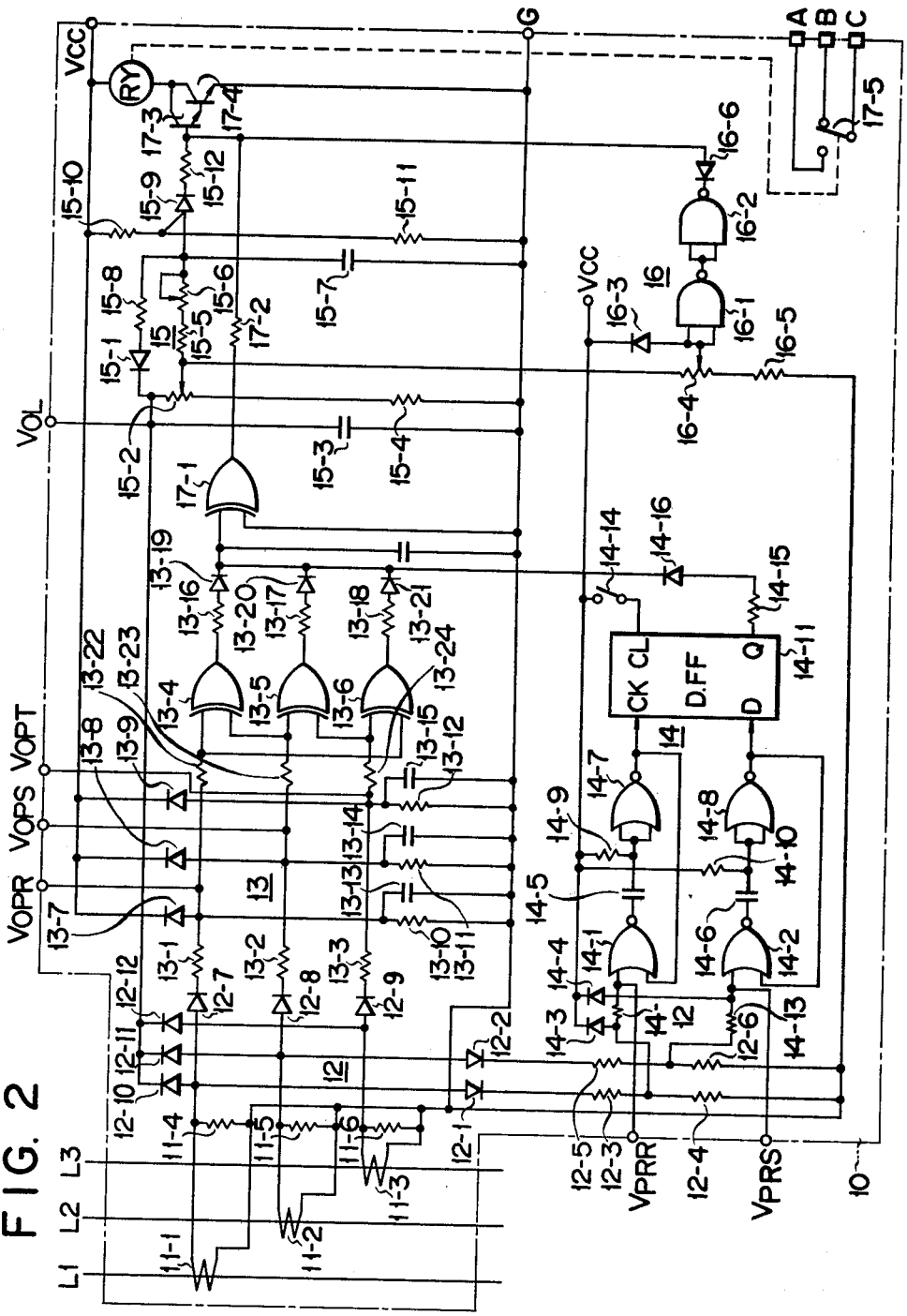
FIG. 2 is a circuit diagram of the embodiment shown in FIG. 1.

The scheme of the static protective relay shown in FIG. 1 may be embodied as shown in FIG. 2. In FIG. 2, like reference numerals are used to designate like portions in FIG. 1. As shown, the phase lines L1 to L3 of the three phase AC power lines are coupled with three current transformers 11-1, 11-2 and 11-3 cooperatively forming the current/voltage converter 11. The primary currents flowing through the phase lines L1 to L3 are transformed into the secondary currents by the current transformers 11-1 to 11-3, respectively. The secondary currents are converted into corresponding voltages by resistors 11-4 to 11-6, respectively.

The voltages of given two phases of the AC voltages for the respective phases, for example, the voltages obtained across the resistors 11-4 and 11-5 coupled with the current transformers 11-1 and 11-2 are applied to a voltage divider having resistors 12-3, 12-4, and 12-5, 12-6, through two diodes 12-1 and 12-2 which are included in the half-wave rectifier 12. One of the half-wave rectified voltages of which the voltages are adjusted to given values by the voltage divider, is applied from the connection point between the resistors 12-3 and 12-4 through a protection resistor 14-12 to one of the input terminals of an NOR circuit 14-1 within the negative phase sequence detecting device 14. The other half-wave rectified voltage is applied from the connection point between the resistors 12-5 and 12-6 to one of the input terminals of an NOR circuit 14-2 through a protection resistor 14-13. The connection points between the pairs of the resistors 12-3 and 12-4 and the resistors 12-5 and 12-6 are connected through diodes 14-3 and 14-4 to a power source terminal Vcc. The diodes 14-3 and 14-4 are used for protecting the NOR circuits 14-1 and 14-2.

The output terminals of the NOR circuits 14-1 and 14-2 are respectively connected to the common input terminals of NOR circuits 14-7 and 14-8, through capacitors 14-5 and 14-6. The output terminals of the NOR circuits 14-7 and 14-8 are connected to the other inputs of the NOR circuits 14-1 and 14-2, respectively. The common input terminals of the NOR circuit 14-7 and 14-8 are connected through resistors 14-9 and 14-10 to the positive power source terminal Vcc. The output terminals of the NOR circuits 14-7 and 14-8 are respectively connected to a clock terminal CK and a data terminal D of a data flip-flop 14-11. The clear terminal CL is connected through a switch 14-14 to the power source terminal Vcc. The output terminal Q of the data flip-flop 14-11 is connected to one of the input terminals of an exclusive OR circuit 17-1, through a resistor 14-15 and a diode 14-16. The other input terminal of the exclusive OR circuit 17-1 is connected to a ground terminal G of the half-wave rectifier circuit 12.

Figure 3A:
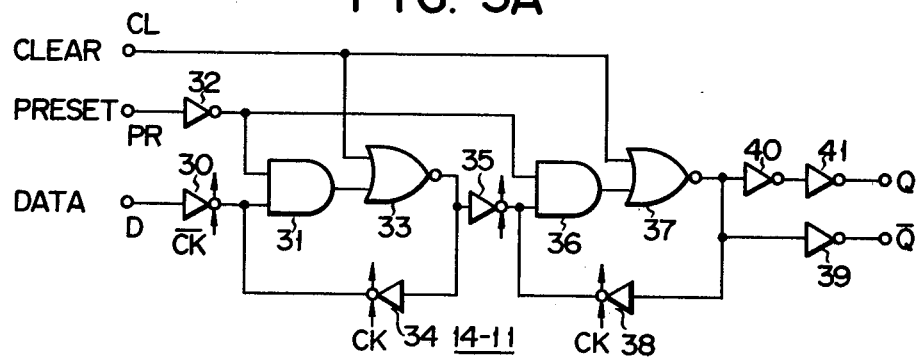
FIGS. 3A and 3B are detailed circuits of a data flip-flop used in the circuit shown in FIG. 2.
Figure 3B:
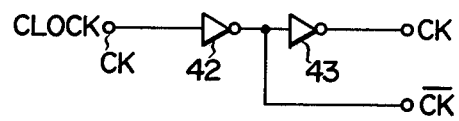

The data flip-flop 14-11 used in the circuit shown in FIG. 2 is constructed as shown in FIGS. 3A and 3B, for example. In FIG. 3A, the data input terminal D is connected through a clocked inverter 30 to one of the input terminals of an AND circuit 31. The other input terminal of the AND circuit 31 is connected to a preset terminal PR through an inverter 32. An output terminal of the AND circuit 31 is connected to one input terminal of an NOR circuit 33 of which the other input terminal is connected to the clear terminal CL. The output terminal of the NOR circuit 33 is connected through a feedback circuit including a clocked inverter 34 to one of the input terminals of the AND circuit 31 and to one of the input terminals of an AND circuit 36 through a clocked inverter 35. The other input terminal of the AND circuit 36 is connected to the preset terminal PR through the inverter 32. The output terminal of the AND circuit 36 is connected to one of input terminals of an NOR circuit 37 of which the other input terminal is connected to the clear input terminal CL. The output terminal of the NOR circuit 37 is connected through a feedback circuit including a clocked inverter 38 to one of the input terminals of the AND circuit 36 and to a $\bar{Q}$ output terminal of the data flip-flop 14-11 through an inverter 39. An output terminal of the NOR circuit 37 is connected to the Q output terminal, through two inverters 40 and 41. As shown in FIG. 3B, the clock terminal CK is connected through two inverters 42 and 43 to the non-inverted clock terminal CK, and to the inverted clock terminal $\overline{CK}$, through only the inverter 42. A clocked inverter described in U.S. Pat. No. 3,737,673 may be used as the clocked inverters 30, 34, 35 and 38.

The truth table describing the relations between the outputs Q and $\bar{Q}$ vs. the inputs CL, PR, D and CK of the data flip-flop 14-11, is given below.

| INPUTS | | | | OUTPUTS | |
|---|---|---|---|---|---|
| CL | PR | D | CK | Q | $\bar{Q}$ |
| L | L | L | ⤒ | L | H |
| L | L | H | ⤒ | H | L |

As seen from the above table, when the clear input CL and the preset input PR are both LOW (L), the output Q or $\bar{Q}$ depends on a state of the data input D at the transition from low to high of the clock pulse CK. When the data input D is LOW (L), the output Q is LOW (L). When it is HIGH (H), the output Q is HIGH (H).

Figure 4:
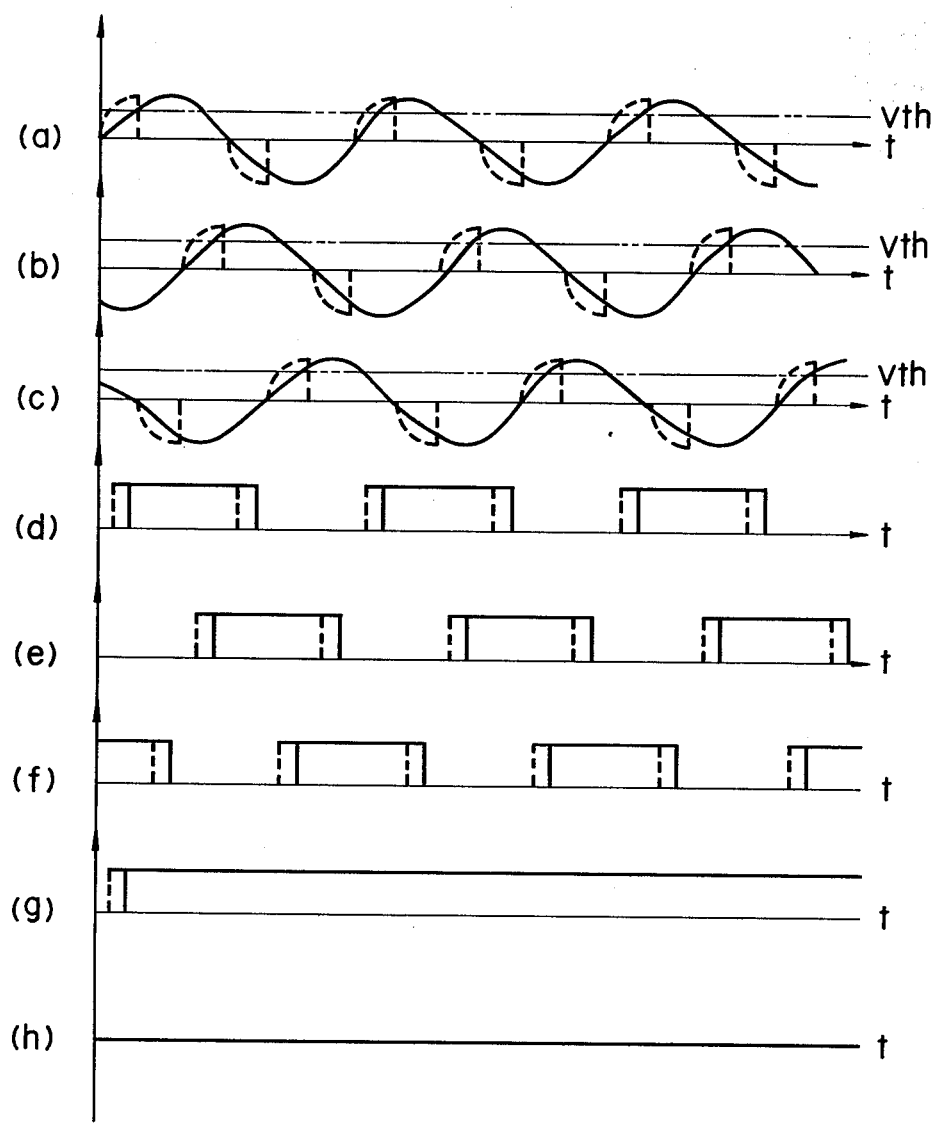
FIGS. 4 to 6 are graphic diagrams useful in explaining the operation of the circuit shown in FIG. 2.

The operation of the negative phase sequence detecting device 14 will be described by referring to FIG. 4, before the explanation of the construction and operation of the portion other than the negative phase sequence detecting device 14.

The waveforms of the phase voltages obtained across the resistors 11-4, 11-5 and 11-6 are illustrated in FIGS. 4(a) to 4(c), respectively. In those figures, the waveforms depicted by continuous lines are the output voltages obtained when the load current is relatively small. Those by dotted lines are obtained when it is relatively large. The AC voltages (FIGS. 4(a) and 4(b)) of two phases obtained across the resistors 11-4 and 11-5 are half-wave rectified by the diodes 12-1 and 12-2 and are applied to the one input terminals of the NOR gates 14-1 and 14-2, respectively. The positive half-wave (H) from the diode 12-1 and the output signal (H) from the NOR gate circuit 14-7 are applied to the NOR gate 14-1, so that the output voltage of the NOR gate 14-1 falls to LOW (L). Upon the termination of the positive half-wave from the diode 12-1, the input signal to the NOR circuit 14-1 becomes LOW (L) and the output voltage from the circuit 14-1 becomes HIGH (H). In this way, the pulse waveform as shown in FIG. 4(d) is produced from the NOR circuit 14-1. The output from the NOR circuit 14-1 is applied through a delay circuit consisting of the capacitor 14-5 and the resistor 14-9 to the NOR circuit 14-7 serving as an inverter. The delaying period at the delay circuit is maintained constant without sequence affected by the level of the load current. Accordingly, one transition from low to high is applied from the NOR circuit 14-7 to the clock input terminal CK of the data flip-flop 14-11, in response to the transition from low to high of the positive half-wave. At this time, the rectified voltage coming through the diode 12-2 from the half-wave rectifier 11-2 is normal in the phase order, it is wave-shaped by the NOR circuits 14-2 capacitor 14-6, resistor 14-10 and 14-8 to have the waveform as shown in FIG. 4(e). In other words, as the pulse shown in FIG. 4(d) transits from low to high, the voltage of FIG. 4(e) is L and the output Q becomes L, as seen from the said truth table. Where, as current blocking diodes 13-19, 13-20 and 13-21 are connected between a cathode electrode of the diode 14-16 and output terminals of exclusive OR circuits 13-4, 13-5 and 13-6 of the phase failure detecting device 13, no current flows into the exclusive OR circuits 13-4, 13-5 and 13-6 from the diode 14-16. As a result, the base potential of the combination of transistors 17-3 and 17-4, which are combined in Darlington fashion, is L, so that no base current flows therethrough and an output relay Ry is not activated.

When the phase sequence of the AC lines L2 and L3 are inverted, the voltage waveform as shown in FIG. 4(c) appears at the output of the current transformer 11-2. And the pulse voltage applied to the data terminal D of the data flip-flop 14-11 through the NOR circuits 14-2 and 14-8 has a waveform as shown in FIG 4(f). Accordingly, in this case, when the pulse applied to the clock terminal CK of the data flip-flop 14-11 transits from low to high in response to the pulse of FIG. 4(d), the data input is H and the output Q becomes H, too. As a result, the Darlington combined transistors 17-3 and 17-4 become conductive state and the output relay Ry is active. The terminal B-C is open and terminal AC becomes conductive.

Thus, the negative phase sequence can be reliably detected with the above-mentioned compact circuit and the simplification of the circuit is also possible.

The description to follow is the elaboration of the circuit constructions and the operations of the phase failure detecting circuit 13 and the overload detecting circuit 15 of the embodiment shown in FIG. 2.

The construction of the phase failure detecting circuit 13 will first be described. In FIG. 2, the output currents from the current transformers 11-1 to 11-3 are converted into corresponding voltages by the resistors 11-4, 11-5 and 11-6, and then are half-wave rectified by diodes 12-7, 12-8 and 12-9, respectively. The rectified voltages are applied to respective input terminals of the exclusive OR circuits 13-4, 13-5 and 13-6 through resistors 13-1 to 13-3, and resistors 13-22, 13-23 and 13-24, respectively. The voltage passed through the resistor 13-1 is inputted to the other input terminal of the exclusive OR circuit 13-6 through the resistor 13-22 and the voltages passed through the resistors 13-2 and 13-3 are applied to the other input terminals of the exclusive OR circuits 13-4 and 13-5 through the resistors 13-23 and 13-24. The output terminals of the resistors 13-1 to 13-3 are also connected to the power source Vcc, through diodes 13-7 to 13-9, and are connected to the ground terminal G, through smoothing circuits having the combinations of resistors 13-10 to 13-12 and capacitors 13-13 to 13-15, as shown.

Three exclusive OR circuits 13-4 to 13-6 are connected at the output terminals to one of the input terminals of the exclusive OR circuit 17-1 at the output stage, through resistors 13-16 to 13-18 and the diodes 13-19 to 13-21.

The construction of the overload detecting circuit 15 is as follows. The output currents from the current transformers 11-1 to 11-3 are converted by the resistors 11-4 to 11-6 into corresponding voltages, respectively and then are half-wave rectified by diodes 12-10 to 12-12, respectively. The cathodes of the diodes 12-10 to 12-12 are commonly connected to the connection point between the cathode of a diode 15-1 and one of the ends of the fixed resistive portion of a variable resistor 15-2. The common connection point of the diodes 12-10 to 12-12 and the ground terminal G have a smoothing capacitor 15-3 connected therebetween. The other end of the resistive portion of the variable resistor 15-2 is connected to the ground terminal G through a resistor 15-4. The sliding terminal of the variable resistor 15-2 is connected to one of the ends of a fixed resistive portion of a variable resistor 15-6 through a resistor 15-5. The other fixed end of the variable resistor 15-6, together with the sliding terminal thereof, is connected to the one end of a timer capacitor 15-7. The one end of the capacitor 15-7 is connected through a resistor 15-8 to the anode of the diode 15-1 and to one end of a programmable uni-junction transistor 15-9. The other end of the timer capacitor 15-7 is connected to the ground G. The gate terminal of the programmable uni-junction transistor 15-9 is connected to the connection point between voltage dividing resistors 15-10 and 15-11 connected in series between the power source Vcc and the ground G. With this connection, a given potential is applied to the gate terminal of the transistor 15-9. The other end of the transistor 15-9 is connected to the base of the output stage transistor 17-3 through a resistor 15-12.

The construction of the operating point setting circuit 16 will be described below. The circuit 16 includes two NAND circuits 16-1 and 16-2 connected in cascade fashion. The two input terminals of the NAND circuit 16-1 are commonly connected with one another and connected through a diode 16-3 in the forward direction to the power source Vcc, and also to the sliding terminal of a variable resistor 16-4. One fixed end of the variable resistor 16-4 is connected to the sliding terminal of the variable resistor 15-2 in the overload detecting circuit 15. The variable resistor 16-4 is connected at the other fixed end to the ground side of the half-wave rectifier circuit 12, through a resistor 16-5. The output terminal of the NAND circuit 16-2 is connected to the base of the output stage transistor 17-3, through a diode 16-6 connected backward for the output terminal thereof.

Figure 5:
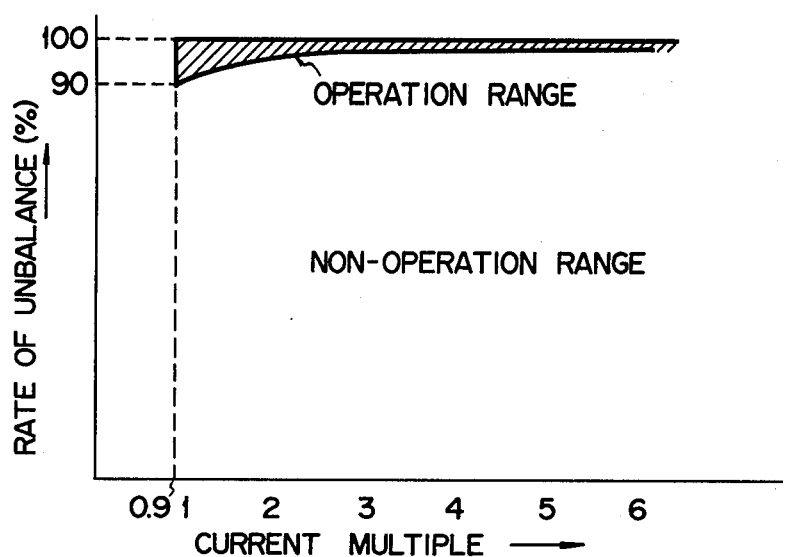
Figure 6:
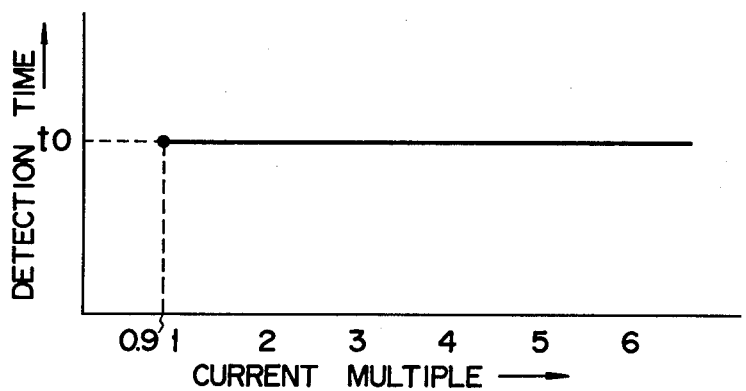

The operation of the phase failure detecting circuit 13 will be described. If the currents on the phase lines L1 to L3 are above a given value, the levels of the smoothed DC voltages at the connection points between the pairs of resistors 13-1 and 13-10, 13-2 and 13-11, and 13-3 and 13-12, are all HIGH (H), and the input to the exclusive OR circuits 13-4 to 13-6 are all H. Accordingly, the outputs of the exclusive OR circuits 13-4 to 13-6 are all L. Under this condition, the inputs of the exclusive OR circuit 17-1 is (L, L) and the relay Ry is not operated. At this time, if the current of the phase line L1 extremely decreases, the output voltage on the smoothing circuit including resistors 13-1 and 13-10 and a capacitor 13-13 also decreases, so that levels at one input terminals of the exclusive OR circuits 13-4 and 13-6 become LOW (L). As a result, the output levels of the exclusive OR circuits 13-4 and 13-6 become HIGH (H) and the inputs of the exclusive OR circuit 17-1 becomes H and L, so that the output relay Ry is driven to effect the protection operation. This protection operation is similarly performed even if the phase failure occurs on the phase line L2 or L3. The sensitivity of the phase failure detection is determined by the threshold voltage of the input levels H and L of each exclusive OR circuit 13-4, 13-5, 13-6 and 17-1. Particularly, the lower the threshold values are the narrowes, it is possible to make non-operation regions due to the unbalance of the voltage values among the respective phases. As shown in FIG. 5, the threshold value is usually set to be approximately 90% of the rated value, the detection characteristic of only the phase failure detecting operation may be given to the circuit 13. FIG. 6 graphically expresses a relation between a phase failure detecting time at the circuit 13 and a current multiple. The graph shows that the detecting time $\tau_0$ is always constant irrespective of the current multiple. By convention, the detecting time was inversely proportional to the current multiple.

The operation of the overload detecting circuit 15 will be described. The pulsate voltages rectified by the diodes 12-10, 12-11 and 12-12 are smoothed by the smoothing circuit including the capacitor 15-3, the variable resistor 15-2 and the resistor 15-4, and the set rated output voltage is obtained from the sliding terminal of the variable resistor 15-2. The set voltage is applied to the capacitor 15-7 through the resistor 15-5 and the variable resistor 15-6 of the timer circuit. The time setting of the timer circuit is determined by the variable resistor 15-6. Under this condition, when the phase lines L1 to L3 are in an overload condition, the charging voltage of the timer capacitor 15-7 rises and exceeds the sum of the gate voltage of the programmable uni-junction transistor 15-9, which is set by the resistors 15-10 and 15-11, and the offset voltage to switch P.U.T. (programmable uni-junction transistor). For this, the transistor 15-9 begins to be conductive, so that the output signal is applied to the base of the output stage transistor 17-3, through the resistor 15-12 thereby to drive the output relay Ry. Incidentally, the resistor 15-8 and the diode 15-1 form a rapid discharge circuit for preventing an erroneous operation of the circuit at the time of including of main circuit current.

The operation of the operating point setting circuit 16 will be described. The input of the circuit 16 is set by moving the sliding terminal of the variable resistor 16-4. If the set value is small, the output level of the NAND circuit 16-2 is LOW (L) to bias the base of the output stage transistor 17-3 at zero. If so set, even if the outputs of the phase failure detecting circuit 13 and the negative phase sequence detecting circuit 14 are given through the output stage exclusive OR circuit 17-1, the output relay Ry is not driven to never produce the trip output. The unbalance characteristic shown in FIG. 5 is depicted when the set value is 90%.

Figure 7:
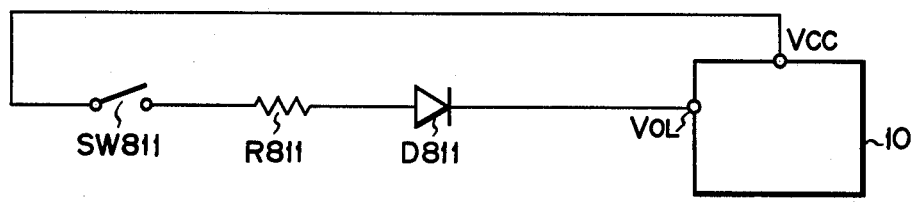
FIG. 7 is a circuit diagram of an overload detection checking circuit.
Figure 8:
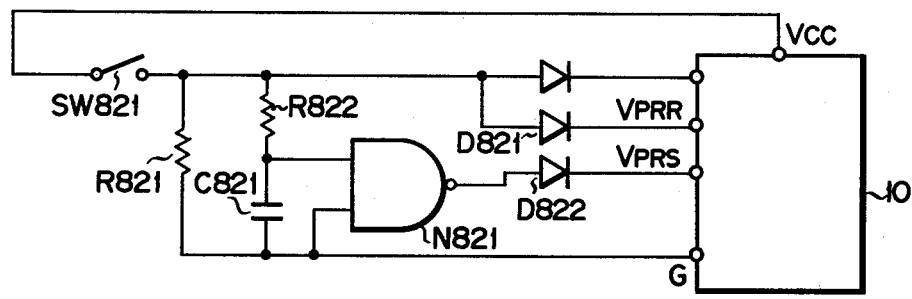
FIG. 8 is a circuit diagram of a negative phase failure detection checking circuit.
Figure 9:
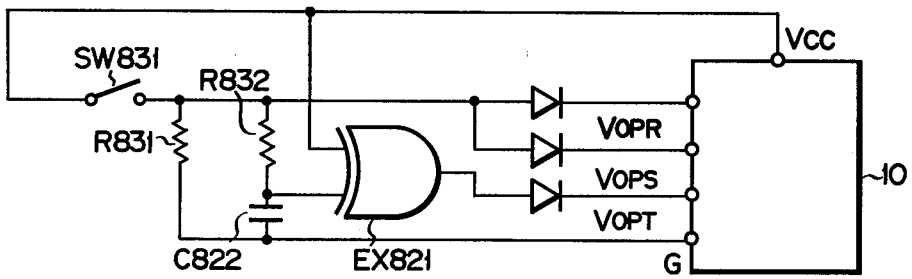
FIG. 9 is a circuit diagram of a phase failure detection checking circuit.

Description will be given of the circuit construction and operation of each function checking circuit which is provided for each protective function in the protective relay 10 shown in FIG. 2. Reference is made to FIGS. 7 to 9. In the circuits, the terminals Vcc, $V_{OL}$, $V_{PRR}$, $V_{PRS}$, G, $V_{OPR}$, $V_{OPS}$ and $V_{OPT}$ in the check circuits are connected to the terminals with the corresponding reference symbols in the protective relay 10 in FIG. 2, respectively.

FIG. 7 is an overload detection checking circuit, in which a switch SW811, a resistor R811, and a diode D811 are connected in series between the terminal Vcc and the terminal $V_{OL}$. In the checking circuit, the power source voltage Vcc is supplied as a test voltage to the timer capacitor 15-7 through the diode D811 and the resistor R811, so that the capacitor 15-7 is charged to render the programmable uni-junction transistor 15-9 active to check the function of the overload detection circuit 15.

FIG. 8 is a negative phase sequence detection checking circuit, in which a switch SW821 and a diode D821 are connected in series between the terminal Vcc and the terminal $V_{PRR}$ in the protective relay 10. A resistor R821 is connected between one end of the switch SW821 and the terminal G and a resistor R822 and a capacitor C821 are connected in series across the resistor R821. The connection point between the resistor R822 and the capacitor C821 is connected to one input terminal of an NAND circuit N821 of which the other input terminal is connected to the terminal G. The output terminal of the NAND circuit N821 is connected through a diode D822 to the terminal $V_{PRS}$.

In FIG. 8, when the switch SW821 is OFF, the terminals $V_{PRR}$ and $V_{PRS}$ remain LOW. Accordingly, the data terminal D of the data flip-flop 14-11 shown in FIG. 2 and the signal of the clock terminal CK thereof is low and the output Q is also LOW. On the other hand, when the switch SW821 is turned on, the output signal from the NAND circuit N821 rises after the constant delay determined by the resistor R822 and the capacitor C821 in the circuit. As a result, in the data flip-flop 14-11, a data signal which is HIGH when the signal of the clock CK transits from LOW to HIGH is applied thereto, and the function of the negative phase sequence detecting circuit 14 may be checked if the output Q becomes HIGH or not.

FIG. 9 is a circuit diagram of the phase failure detecting check circuit which is similar to the negative phase sequence detecting check circuit shown in FIG. 8. The differences of the circuit of FIG. 9 from the FIG. 8 circuit are: an exclusive OR circuit EX821 is used in place of the NAND circuit N821 and one of the input terminals of the circuit EX821 is connected not to the terminal G, but to the power source terminal Vcc. When the switch SW831 is turned on, the voltages $V_{OPR}$, $V_{OPS}$ and $V_{OPT}$ rise. Then, one input of the circuit EX821 also becomes HIGh after the constant delay defined by the resistor R832 and the capacitor C822 of the circuit. Accordingly, the output signal thereof becomes LOW and the voltage $V_{OPT}$ falls. If the time constant of the timer circuit is properly selected, the phase failure detecting operation is performed after a proper delay since the switch SW831 is turned on. Accordingly, it is easy to know on what phase line the phase failure occurs by the interval from the turning on of the switch SW831 to outputting of the phase failure detection signal.

What is claimed is:

1. A static protective relay comprising:
   phase current detecting means including plural current transformers inserted in respective poly-phase AC power lines for producing respective voltages proportional to phase currents of respective of said AC power lines;
   half-wave rectifying means for rectifying the voltages obtained from each said current transformer to produce respective rectified voltages having a predetermined relative phase relationship; and
   negative phase sequence detecting means coupled to said rectifying means for processing the rectified voltages, including
   a wave shaping circuit including means for generating trigger outputs in response to given portions of said voltages delivered from respective of said current transformers, means for generating rectangular wave outputs having predetermined widths in response to said trigger outputs, and first and second logic gates to which said rectified voltages and rectangular wave outputs are applied, and
   means for detecting that one of the rectified voltages is at a predetermined voltage level when a selected other of said rectified voltages transits from a first voltage level to a second voltage level.

2. A static protective relay according to claim 1, wherein said negative phase sequence detecting means comprises:
   a data flip-flop having a clock terminal and a data terminal to which said first and second rectangular signals are applied, said flip-flop producing an output voltage proportional to the level of said second rectangular wave signal at the time that said first rectangular wave signal transits from a low to a high level.

3. A static protective relay according to claims 1 or 2, further comprising:
   overload detecting means coupled to said rectifying means for detecting if any of said poly-phase AC lines are in an overload condition, wherein said overload detecting means is characterized by a time delay inversely proportional to the rectified voltages produced by said half-wave rectifying means;
   phase failure detecting means which receives and smoothes the rectified voltages produced by said half-wave rectifying means for producing an output signal when at least one of said smooth voltages is not higher then a predetermined value; and,
   operating point setting means which receives and smoothes the rectified voltages produced by said half-wave rectifying means, wherein when one of said smoothed voltages is below a predetermined value, none of the output signals produced by said overloaded detecting means, said phase failure detecting means, and said negative phase sequence detecting means can be adapted for application to a relay output circuit, while one said smoothed voltages are above said predetermined value, the output signal from said overloaded detecting means, said phase-failure detecting means, and negative phase sequence detecting means can be adapted for application to a relay output circuit.

* * * * *